(12) United States Patent
Samie et al.

(10) Patent No.: US 8,011,464 B2
(45) Date of Patent: Sep. 6, 2011

(54) ELECTRIC DRIVE SYSTEM WITH A SELECTABLE ONE-WAY CLUTCH

(75) Inventors: Farzad Samie, Franklin, MI (US); Joel M. Maguire, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 271 days.

(21) Appl. No.: 12/178,693

(22) Filed: Jul. 24, 2008

(65) Prior Publication Data

US 2010/0018786 A1 Jan. 28, 2010

(51) Int. Cl.
*B60K 17/02* (2006.01)
(52) U.S. Cl. .................. 180/65.6; 180/65.21; 180/65.22
(58) Field of Classification Search .................. 180/2.2, 180/65.1, 65.21, 65.22, 65.225, 65.23, 65.235, 180/65.24, 65.25, 6, 5.26, 65.265, 65.27, 180/65.275, 65.28, 65.285, 65.29, 65.6, 65.7; 192/41 R, 42, 43, 43.1, 43.2, 44, 45, 45.1, 192/45.2, 46, 41 S, 41 A
See application file for complete search history.

(56) References Cited

U.S. PATENT DOCUMENTS

| | | | |
|---|---|---|---|
| 1,978,737 A * | 10/1934 | Bower et al. ................. | 361/154 |
| 3,009,322 A * | 11/1961 | Mercier ....................... | 91/167 R |
| 4,417,642 A * | 11/1983 | Suzuki et al. ................ | 180/249 |
| 5,385,513 A | 1/1995 | Ishii et al. | |
| 5,704,440 A * | 1/1998 | Urban et al. ................. | 180/65.23 |
| 6,290,044 B1 | 9/2001 | Burgman et al. | |
| 6,550,594 B1 * | 4/2003 | Peura .............................. | 192/44 |
| 6,770,005 B2 | 8/2004 | Aikawa et al. | |
| 7,017,542 B2 | 3/2006 | Wilton et al. | |
| 7,094,172 B2 | 8/2006 | Ishikawa | |
| 7,163,480 B2 | 1/2007 | Supina et al. | |
| 7,296,644 B2 | 11/2007 | Teraoka | |
| 7,363,995 B2 | 4/2008 | Downs et al. | |
| 2005/0182533 A1* | 8/2005 | Tobler et al. .................... | 701/22 |
| 2007/0278061 A1* | 12/2007 | Wittkopp et al. ............ | 192/43.1 |
| 2008/0169165 A1 | 7/2008 | Samie et al. | |
| 2009/0242289 A1 | 10/2009 | Murty | |

FOREIGN PATENT DOCUMENTS

JP 2001287550 A 10/2001

* cited by examiner

*Primary Examiner* — Hau V Phan
*Assistant Examiner* — Bryan A Evans
(74) *Attorney, Agent, or Firm* — Quinn Law Group, PLLC

(57) ABSTRACT

A vehicle has a motor and axles which are selectively rotatable by the motor, a reduction gear set, a differential transferring torque from the motor to the axles, and selectable one-way clutch (SOWC) assemblies. The SOWC assemblies are connected to a different one of the axles, and are engaged to transfer torque to the drive axles whenever the motor is energized. The SOWC assemblies are disengaged when the motor is de-energized to prevent rotation of the rotor and various elements of the reduction gear set and differential. A method minimizes parasitic spin losses in an electric rear drive motor (eRDM) system. The method includes engaging a pair of SOWC assemblies when the motor is on to transfer torque from the motor to the axles, and disengaging the SOWC assemblies when the motor is off to prevent rotation of a rotor and of elements of the reduction gear set and differential.

14 Claims, 2 Drawing Sheets

| STATE OF SOWC (30) | STATE OF SYSTEM (21) | DESCRIPTION |
|---|---|---|
| X | ON | eRDM MODE |
| O | OFF | PLR MODE |

ELECTRIC DRIVE SYSTEM WITH A SELECTABLE ONE-WAY CLUTCH

TECHNICAL FIELD

The present invention relates to a system and a method for optimizing the performance of a vehicle equipped with an electric drive system for selectively propelling the vehicle.

BACKGROUND OF THE INVENTION

Vehicles can be selectively powered using electrical energy in order to improve overall fuel economy, as well as to reduce levels of various vehicle emissions. In order to store sufficient amounts of electrical energy for propelling the vehicle over an adequate range, an electrical storage device or ESD such as a battery, battery pack, or other electrochemical energy storage device can be used to selectively energize one or more electric motors. Hybrid electric vehicles (HEV), plug-in hybrid electric vehicles (PHEV), fuel cell electric vehicles (FCEV), or purely electric vehicles (EV) can use the ESD as a source of at least a portion of the electrical energy needed for propelling the vehicle.

For the various vehicles listed above, the range of the vehicle is generally proportional to the amount of electrical energy that can be stored within the ESD. However, ESDs such as battery packs can contribute significant weight and mass to the vehicle, and can therefore affect the available range and overall size of the vehicle. Therefore, in certain vehicle designs a dedicated drive motor is connected to one or more drive shafts or axles. For example, an electric rear drive motor or eRDM system can selectively impart torque at various times to a rear drive axle in a front-wheel drive vehicle, with a conventional engine providing torque to the main or front drive axle independently of the operation of the eRDM system. A differential can be used to distribute the motor torque between a pair of independently rotatable rear drive axles, with the differential being suitably positioned to allow for forward packaging space for the potentially large ESD. Vehicle systems configured for electrically powering the vehicle in this manner can be referred to as electric drive motor systems, and in particular as electric rear drive motor (eRDM) systems when selectively powering the vehicle from the rear drive axles in a primarily front-wheel drive vehicle. While eRDM systems provide relative operating and packaging advantages over standard electric drive systems, the performance of such systems may remain less than optimal under certain operating conditions.

SUMMARY OF THE INVENTION

Accordingly, a vehicle is provided having an electric motor, drive shafts or axles each selectively rotatable by the motor, a reduction gear set, a differential connected to the reduction gear set for transferring torque from the motor to the drive axles, and a pair of selectable one-way clutch (SOWC) assemblies each connected to a different one of the drive axles. The SOWC assemblies are engaged to thereby transfer torque from the motor to the drive axles whenever the electric motor is energized, and disengaged to prevent rotation of the rotor and various elements of the reduction gear set and the differential whenever the motor is de-energized.

A system is also provided for selectively rotating at least one drive axle of a vehicle having a reduction gear set with a first set of rotatable elements and a differential with a second set of rotatable elements. The system has a motor and at least one selectable one-way clutch (SOWC) assembly connected to the drive axle. The SOWC assembly transfers torque from a rotor of the motor to the drive axle when the SOWC is engaged, and also prevents rotation of the rotor and the first and second sets of elements when disengaged. A controller detects the presence of a predetermined operating state of the system and selectively engages the SOWC assembly only when the presence of the predetermined operating state is detected.

A method for minimizing parasitic spin losses in an electric rear drive motor (eRDM) system includes determining an operating state of an electric motor, and then engaging a pair of selectable one-way clutch (SOWC) assemblies to thereby transfer torque from the motor to the pair of rear drive axles when the operating state is a predetermined operating state. The method further includes disengaging the pair of SOWC assemblies to thereby prevent rotation of a rotor portion of the motor and of first and second sets of elements of a reduction gear set and differential, respectively, when the electric motor is off, thereby minimizing the parasitic spin losses.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
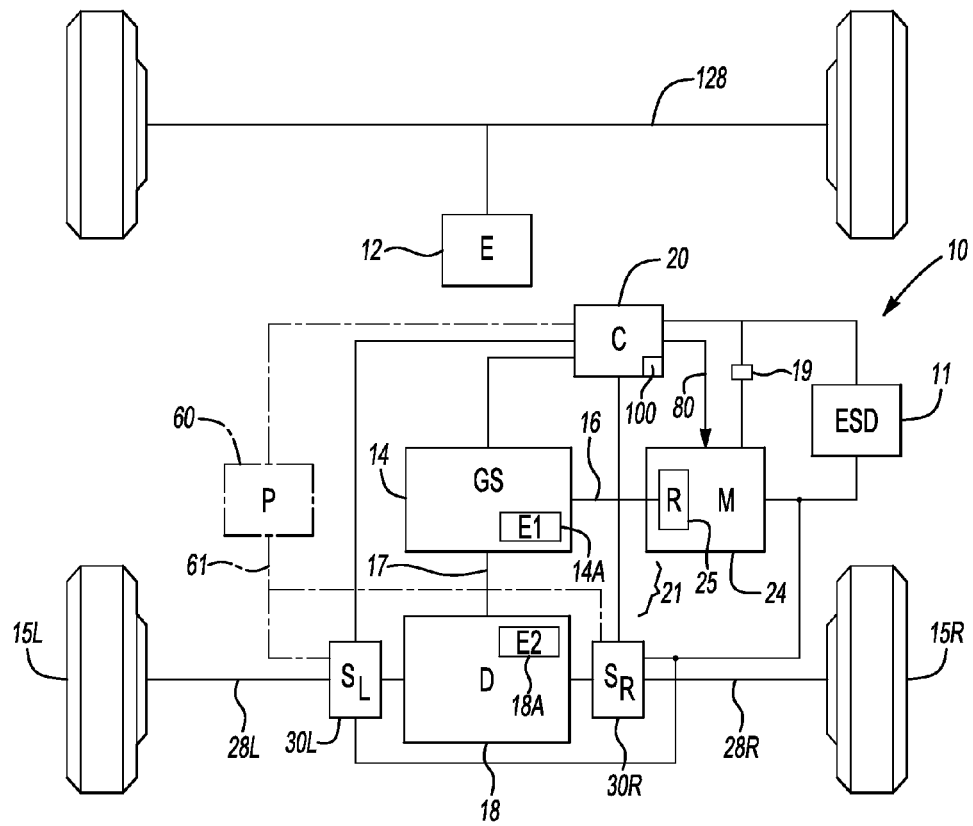
FIG. 1 is a schematic illustration of a vehicle having an electric drive system in accordance with the invention.
FIG. 2 is a truth table describing the operation of a pair of selectable one-way clutches usable within the system of FIG. 1.

Referring to the drawings wherein like reference numbers represent like components throughout the several figures, and beginning with FIG. 1, a vehicle 10 includes a set of road wheels 15L, 15R which are connected to a respective shaft or drive axle 28L, 28R. The reference letters "L" and "R" will be used hereinafter in conjunction with various reference numbers to refer to the respective left and right sides of the vehicle 10 as taken from the perspective of a driver or occupant seated therein. The vehicle 10 includes an electronic drive system 21 adapted for selectively powering, energizing, or otherwise rotating the drive axles 28L, 28R independently from an engine (not shown). Typically, the system 21 provides propulsive energy to the drive axles 28L, 28R, such as a set of rear drive axles, at certain predetermined times when additional propulsive power is required, while an engine 12 provides the primary propulsive energy to a different axle or set of axles, such as a front drive axle or axles 128, as shown schematically in FIG. 1.

As shown in the embodiment of FIG. 1, the system 21 can be configured as an electronic or electric rear drive motor (eRDM) system of the type known in the art, with the drive axles 28L, 28R being rear drive axles. In this configuration, an engine (not shown) would drive the primary or front drive axles (not shown). However, those of ordinary skill in the art will understand that the system 21 could also be configured or adapted for rotating a similarly constructed front axle or axles (not shown) within the scope of the invention, with the engine (not shown) powering the rear drive axles, depending on the particular design of the vehicle 10 to provide a front-wheel or all-wheel drive capability.

In order to provide a sufficient amount of readily accessible electrical energy, the vehicle 10 includes an energy storage device (ESD) 11 such as a nickel cadmium battery, a lithium ion battery, a lead acid battery, or any other suitable electrical or electrochemical device or battery design capable of storing energy for performing useful work as described hereinbelow. The ESD 11 is electrically connected to an electric motor (M) 24 having a rotor (R) 25, with the rotor 25 being mechanically coupled or connected to an input member 16 of a reduction gear set (GS) 14. To power or energize the motor 24, an electronic control unit or controller 20 having an algorithm 100 (see FIG. 3) selectively connects the ESD 11 to the motor 24. The motor 24 may be configured as a motor/generator, and therefore may be configured for recharging the ESD 11 as needed.

The gear set 14 includes a first set of rotatable elements 14A, also labeled E1 for clarity, such as the various planetary gears, clutches, and/or other required rotatable elements necessary for establishing a desired number and/or range of operating modes, gear settings, or states. The gear set 14 also has an output member 17 which acts as an input member to a differential (D) 18. Torque produced or generated by the motor 24 is transferred through the gear set 14 to the differential 18, from which the torque is ultimately distributed as needed between the drive axles 28L, 28R. The differential 18 includes a second set of rotatable elements 18A, also labeled E2 in FIG. 1 for clarity, such as rotatable pinions or other gear elements which together act as a final gear reduction mechanism for the vehicle 10, and which allows the drive axles 28L, 28R to rotate at different speeds as needed.

In addition to the motor 24, the gear set 14, and the differential 18, the system 21 includes a pair of selectable one-way clutch (SOWC) assemblies 30L, 30R, which are respectively labeled as SL and SR in FIG. 1 for clarity. Each of the SOWC assemblies 30L, 30R can be selectively engaged and disengaged as determined by the controller 20 based on a predetermined operating mode, condition, or state of the vehicle 10 or any of its resident systems, such as the motor 24. Such a predetermined state can be detected using a sensor 19, the algorithm 100, and/or a combination of the two.

The SOWC assemblies 30L, 30R can be configured as any device or system capable of freewheeling in one direction and of holding toque in the opposite direction when released or disengaged, and for transmitting torque from the differential 18 to the drive axles 28L, 28R when engaged. For example, each of the SOWC assemblies 30L, 30R can be configured as a roller-type or style of SOWC, a sprag-type SOWC, a rocker-type SOWC, or a diode-type SOWC device of the type known in the art, although the SOWC assemblies 30L, 30L are not intended to be limited to the specific SOWC designs listed here. Likewise, the SOWC assemblies 28L, 28R may be applied or engaged using any suitably configured actuator 35 (see FIG. 2), which can be an electromechanical device powered or energized using electricity provided by the ESD 11. Alternately, the actuator 35 of FIG. 3 can be a mechanical device powered or energized using pressurized fluid supplied by an optional fluid pump (P) 60 as shown in phantom. Such a pump 60 can be connected to the SOWC assemblies 30R, 30L via a fluid passage, pipe, line, or other conduit 61 suitable for communicating hydraulic fluid pressure to the SOWC assemblies 30R, 30L as needed.

Referring to FIG. 2 with reference to various aspects or elements of the vehicle 10 of FIG. 1, within the scope of the invention the system 21 includes at least two operating modes or states. Mode 1 is any electronic drive mode such as the eRDM mode described above, which is suitable for selectively propelling the vehicle 10 of FIG. 1. When the controller 20 determines or detects the presence of a predetermined operating state, such as a state in which the motor 24 of FIG. 1 is energized or otherwise commanded "on" for the purpose of rotating the drive axles 28L, 28R for propelling the vehicle 10, the SOWC assemblies 30L, 30R are immediately engaged. The engaged SOWC assemblies 30L, 30R act in such a manner as to allow torque from the rotor 25 of the motor 24 to be transferred or transmitted to the drive axles 28L, 28R via the gear set 14 and the differential 18. Likewise, Mode 2 is executed when the controller 20 determines or detects that the predetermined operating state is no longer present, such as the motor 24 is no longer energized, on, or active.

In Mode 2, also referred to as the Parasitic Loss Reduction Mode or PLR Mode as shown in FIG. 2, the SOWC assemblies 30L, 30R are each disengaged or de-energized to allow the SOWC assemblies 30L, 30R to thereby freewheel in one direction, and to lock or hold torque in the other direction. By holding torque in the other direction, the SOWC assemblies 30L, 30R prevent rotation of any of the various components in the gear set 14, motor 24, and differential 18, the rotation of which could impart undesirable drag on the road wheels 15 (see FIG. 1), thus affecting the performance of the vehicle 10. These components are represented generally in FIG. 1 as the first set of elements 14A of the gear set 14, the second set of elements 18A of the differential 18, and the rotor 25 of the motor 24. The first and second set of elements 14A and 18A, can be exemplified as the various gear elements, clutches, bearings, etc. of the gear set 14 and differential 18, respectively.

Figure 3:
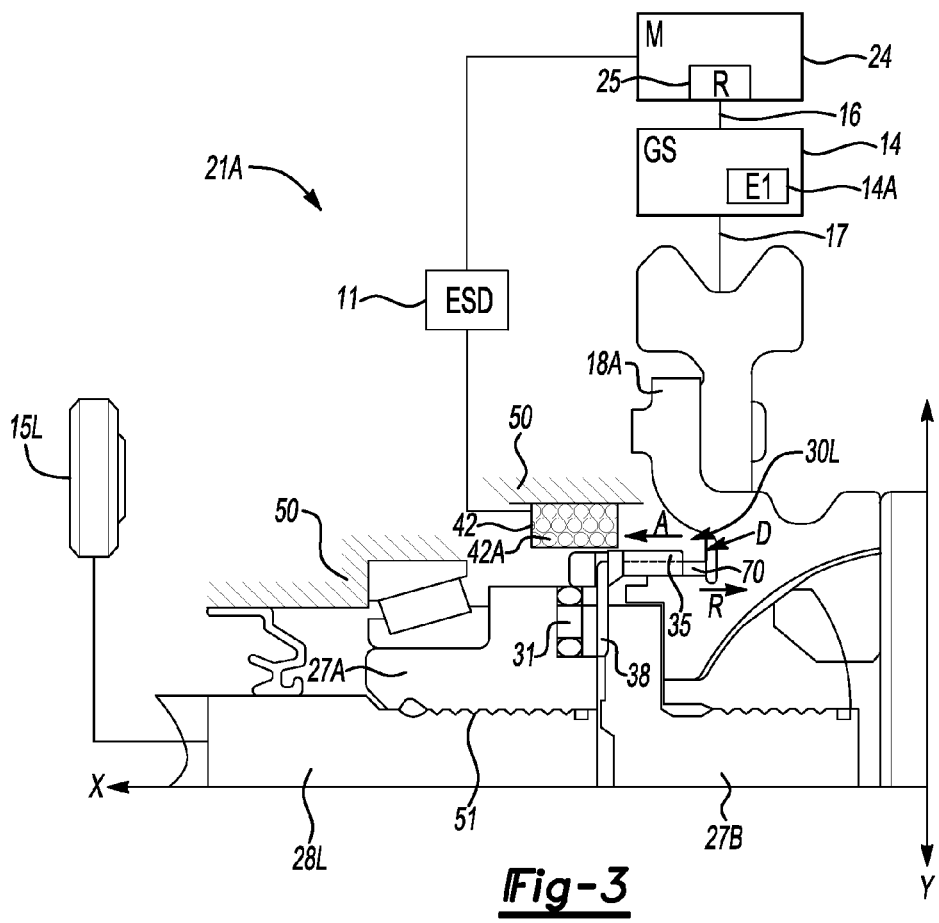
FIG. 3 is a schematic illustration of an exemplary embodiment of the system shown in FIG. 1.

Referring to FIG. 3, one possible embodiment of the system 21 of FIG. 1 is shown as the system 21A, with only one SOWC assembly 30L and only one drive axle 28L shown for simplicity. The description below applies equally to the other drive axle 28R and the other SOWC assembly 30R. FIG. 3 is a schematic view of a portion of the vehicle 10 of FIG. 1 along a longitudinal axis "y" of the vehicle 10 and an axis of rotation "x" of the drive axles 28L, 28R of vehicle 10. As shown in FIG. 3, the rotor 25 of the motor 24 is connected to the input member 16 of the gear set 14. The output member 17 of the gear set 14 is rigidly connected to a portion of the second set of elements 18A of the differential 18 (see FIG. 1), such as a ring gear as shown, with torque from the rotor 25 rotating the second set of elements 18A. An inner race 27B of the SOWC assembly 30L is selectively connectable to an outer race 27A of the SOWC assembly 30L, such as via torque-holding pieces or struts, rollers, etc., (not shown), with the outer race 27 being connected or splined via a plurality of teeth to the drive axle 28L. A road wheel 15 is operatively connected to the drive axle 28L.

When the motor 24 is energized by the ESD 11, or by another suitable energy source, an actuator 35 of the system 21A is moved along a spline 70, or alternately along a groove, channel, or other suitable path, using electrical energy from the ESD 11, fluid energy from the pump 60 (see FIG. 1), or using another suitable source of energy, in the axial direction of arrow A to thereby fully engage the SOWC assembly 30L. It is this engaged position that is shown in FIG. 3. The actuator 35 can be configured as a solenoid device, in which a coil 42 of wire 42A connected or mounted to a stationary member 50 is energized by the ESD 11 or another energy source to thereby generate a magnetic field sufficient for moving the actuator 35 as needed. The actuator 35 and the coil 42 can also be contained in a common housing (not shown) which is ultimately connected to or supported by the stationary member 50. Or, the actuator 35 can be configured as a piston device, in which the pump 60 of FIG. 1 provides fluid power via a conduit 61 to move the actuator 35 as needed in an embodiment using a conventional fluid actuation method.

The SOWC assembly 30L can be configured as any one-way torque holding device suitable for achieving the two modes described above with reference to FIG. 2. Regardless of how the SOWC assembly 30L is ultimately configured, a selector device 38 is contained or positioned between the races 27A and 27B, with the race 27 radially supported or biased by a bearing 31. The selector device 38 is rotated by the axial motion of the actuator 35 to thereby engage and disengage the SOWC assembly 30L. In particular, when the SOWC assembly 30L is configured as a roller-type or a sprag-type device of the type known in the art, the selector device 38 can be a roller cage containing a plurality of suitably shaped and/or sized rollers or sprags, respectively (not shown). Likewise, when the SOWC assembly 30L is configured as a diode-type or rocker-type device of the type known in the art, the selector device 38 can be a selector plate having a plurality of windows each containing a suitably shaped and/or sized and oriented torque-holding piece or strut (not shown).

However the actuator 35 is energized, engagement of the SOWC assembly 30L by moving the actuator 35 in the direction of arrow A to the position shown in FIG. 3 connects the rotor 25, the gear set 14, and the differential portion or a second set of elements 18A to the drive axle 28L so that these components rotate in unison in response to the torque provided by the motor 24. That is, torque from the motor 24 is directly transferred to the drive axle 28L through the SOWC assembly 30L to thereby rotate the road wheel 15 connected thereto. To disengage the SOWC assembly 30L, electrical energy from the ESD 11 is disconnected or turned off, or the pump 60 of FIG. 1 is disconnected or turned off, allowing the actuator 35 to move in the direction of arrow R to thereby return to its initial or disengaged position, as represented by the line D. Movement of the actuator 35 to line D allows the SOWC assembly 30L to hold torque in one direction and freewheel in the other, thus preventing the first and second sets of elements 14A and 18A, and the rotor 25, from rotating in the direction in which torque is locked or held, thereby minimizing parasitic spin losses in the system 21A when the system 21A is not energized or running.

Figure 4:
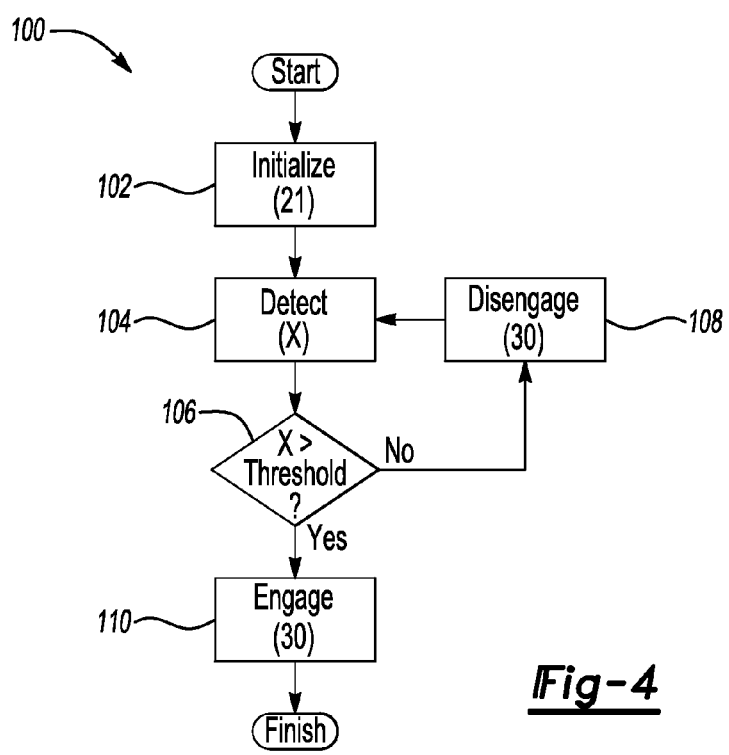
FIG. 4 is a flow chart describing an algorithm or method for using the system of FIGS. 2 and 3.

Referring to FIG. 4 and FIG. 1 together, the method or algorithm 100 for minimizing parasitic spin losses in the vehicle 10 is resident in or readily accessible by the controller 20 of FIG. 1. The algorithm 100 begins with step 102, wherein the system 21 of FIG. 1 is initialized. Initialization can be any process or sub-process which zeroes the system 21 by clearing or erasing any values of prior-recorded measurements to ensure the SOWC assemblies 30L, 30R of FIG. 1 are fully disengaged or released. Step 102 can be executed upon start up of the vehicle 10 while the vehicle 10 remains at rest prior to launch. The algorithm 100 then proceeds to step 104.

At step 104, the algorithm 100 collects data or measurements, represented in FIG. 4 as the variable X, relating to a predetermined operating state of the system 21, and then temporarily stores these values in memory (not shown). For example, the controller 20 may use the sensor 19 of FIG. 1 to measure or detect various quantities or values of the system 21 corresponding to an on/off state of the motor 24, or any other state indicating that the system 21 is being commanded to actively propel the vehicle 10 as described above. Such quantities or values might include, without being limited to, an electrical voltage and/or current supplied from the ESD 11 to the motor 24, a quantity or value of a motor control signal 80 from the controller 20 to the motor 24, and/ or another suitable quantity or motor control value. The algorithm 100 then proceeds to step 106.

At step 106, the algorithm 100 compares the quantities or values collected at step 104 to corresponding threshold values in order to determine if the predetermined operating state is present. If the predetermined operating state is present, the algorithm 100 proceeds to step 110, otherwise the algorithm 100 proceeds to step 108.

At step 108, if the SOWC assemblies are not already currently disengaged, the algorithm 100 can disengage the SOWC assemblies 30L, 30R as described above, such as by disconnecting the actuator 35 from either of the ESD 11 or the pump 60 of FIG. 1, or otherwise de-energizing the SOWC assemblies 30L, 30R, so that the SOWC assemblies 30L, 30R can return to their initial or disengaged position. The algorithm 100 then repeats step 104 as set forth above.

At step 110, the algorithm 100 engages the SOWC assemblies 30, i.e., the SOWC assemblies 30L, 30R as described above, such as by energizing the actuator 35 using either of the ESD 11 or the pump 60, depending on the configuration of the SOWC assemblies 30L, 30R. Once engaged, the SOWC assemblies 30L, 30R can transfer torque from the rotor 25 to the drive axles 28L, 28R as set forth above.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a controller configured to detect a predetermined operating mode of the vehicle;
a first drive axle;
a second drive axle including a pair of drive axles;
an internal combustion engine providing propulsive energy to the first drive axle;
a motor having a rotor, wherein the motor is selectively energized during the predetermined operating mode to thereby selectively provide additional propulsive energy to the second drive axle, wherein the second drive axle is selectively rotatable by the motor for propelling the vehicle in the predetermined operating mode;
a reduction gear set having an output member and a first set of rotatable elements;
a differential positioned between the pair of drive axles of the second drive axle, and having a second set of rotatable elements, the differential being connected to the output member of the reduction gear set and configured for transferring a torque from the motor to the pair of drive axles; and
a pair of selectable one-way clutch (SOWC) assemblies each having an actuator in communication with the controller, and each being connected to a different one of the pair of drive axles of the second drive axle;
wherein the pair of SOWC assemblies is selectively engaged via the controller to transfer the torque from the rotor to the pair of drive axles only when the predetermined operating mode is detected; and
wherein the pair of SOWC assemblies is selectively disengaged via the controller to the SOWC assemblies to prevent rotation of the rotor and each of the first and second sets of rotatable elements when the motor is de-energized.

2. The vehicle of claim 1, wherein each of the pair of SOWC assemblies includes a selector device, wherein the actuator of each of the SOWC assemblies is configured for moving in an axial direction into contact with the selector device to thereby rotate the selector device and thereby engage a respective one of the pair of SOWC assemblies.

3. The vehicle of claim 2, further comprising an electrical storage device (ESD), wherein the actuator is a solenoid device having a coil and a moveable plunger portion which moves in the axial direction when the coil is energized by the ESD.

4. The vehicle of claim 1, wherein the pair of SOWC assemblies is selected from the group consisting of a roller-type SOWC, a rocker-type SOWC, a sprag-type SOWC, and a diode-type SOWC.

5. The vehicle of claim 1, further comprising a pump, wherein the actuator includes a moveable piston which moves in the axial direction in response to fluid pressure provided by the pump.

6. A system for selectively rotating a rear drive axle including a pair of rear drive axles of a vehicle having an engine providing primary propulsive torque to a front drive axle of the vehicle, a gear set with a first set of rotatable elements, and a differential with a second set of rotatable elements, the system comprising:
 a motor having a rotor;
 a pair of selectable one-way clutch (SOWC) assemblies wherein each SOWC assembly of the pair of SOWC assemblies is positioned on a respective one of the pair of rear drive axles, and wherein each SOWC assembly of the pair of SOWC assemblies is configured for transferring a torque from the rotor to a respective one of the pair of rear drive axles when the pair of SOWC assemblies is engaged, and for preventing rotation of the rotor and each of the first and second set of rotatable elements when the pair of SOWC assemblies is disengaged; and
 a controller operable for detecting when additional propulsive torque is required above a level of the primary torque, for transmitting a motor control signal to the motor to turn on the motor when the additional propulsive torque is required, and for selectively engaging the pair of SOWC assemblies when the motor is running to thereby transfer torque from the rotor to the rear drive axles.

7. The system of claim 6, wherein each of the pair of SOWC assemblies is selected from the group consisting essentially of a rocker-type SOWC, a sprag-type SOWC, a roller-type SOWC, and a diode-type SOWC.

8. The system of claim 7, including the roller-type SOWC, wherein the a roller-type SOWC includes a roller cage and a solenoid actuator having a coil and a moveable plunger portion, and wherein the controller is operable for engaging the roller-type SOWC by energizing the coil to induce a magnetic field, thereby moving the moveable plunger portion into contact with the roller cage for engaging the pair of SOWC assemblies.

9. A method for minimizing parasitic spin losses in an electric rear drive motor (eRDM) motor system operable for rotating a pair of rear drive axles in a vehicle having a controller and an engine powering a front drive axle, the eRDM system having an electric motor, a reduction gear set with a first set of rotatable elements, and a differential positioned between the pair of rear drive axles with a second set of rotatable elements, the method comprising:
 turning the electric motor on using the controller when additional propulsive energy is required above a primary propulsive energy level provided by the engine;
 engaging a pair of selectable one-way clutch (SOWC) assemblies via the controller when the electric motor is on and the engine is powering the front axle to thereby transfer torque from the electric motor to the pair of rear drive axles; and
 disengaging the pair of SOWC assemblies via the controller to thereby prevent rotation of a rotor portion of the motor and of the first and second set of rotatable elements when the electric motor is off.

10. The method of claim 9, wherein the pair of SOWC assemblies include an actuator adapted for rotating a selector device containing a plurality of torque-holding pieces; and
 wherein engaging the pair of SOWC assemblies includes moving the actuator in an axial direction into contact with the selector device to thereby rotate the selector device.

11. The method of claim 10, wherein the selector device is one of a selector plate and a roller cage.

12. The method of claim 10, wherein the actuator includes a plunger portion and a coil, and
 wherein moving the actuator includes energizing the coil to thereby induce a magnetic field, and then using the magnetic field to move the actuator.

13. The method of claim 10, wherein the actuator is a piston, and wherein moving the actuator includes supplying fluid pressure from a pump to the piston to thereby move the piston into contact with the selector device.

14. The method of claim 9, wherein the vehicle includes a sensor in communication with the controller, further comprising using the sensor to measure an on/off state of the motor.

* * * * *